W. C. MILES.
COMBINED SHINGLE SAWING AND JOINTING MACHINE.
APPLICATION FILED FEB. 9, 1911.
1,039,312.
Patented Sept. 24, 1912.
2 SHEETS—SHEET 1.
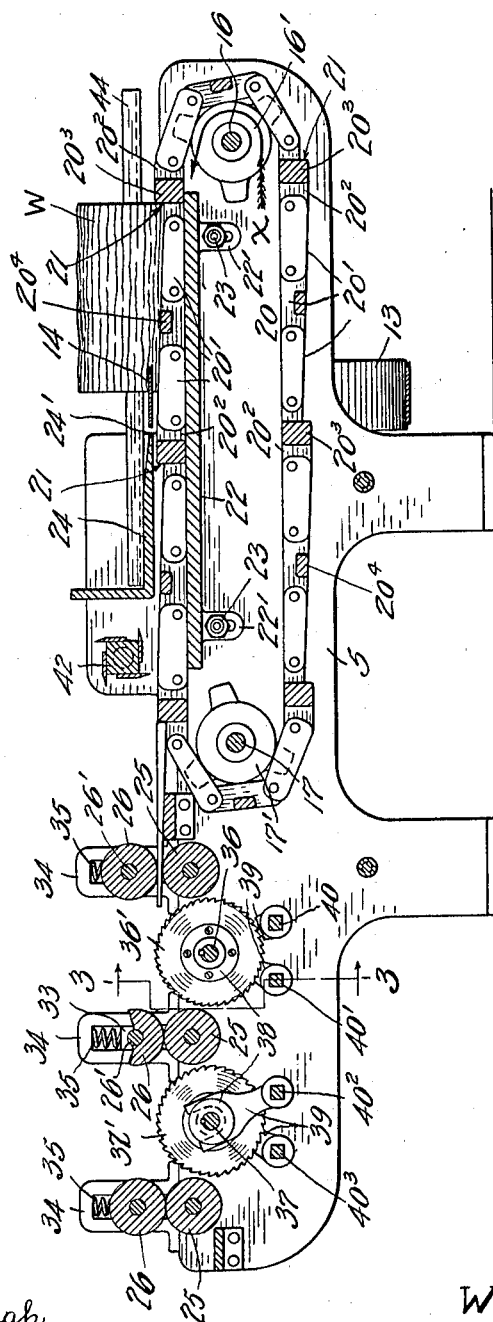
WITNESSES:
INVENTOR
William C. Miles
BY
ATTORNEY W. C. MILES.
COMBINED SHINGLE SAWING AND JOINTING MACHINE.
APPLICATION FILED FEB. 9, 1911.
1,039,312.
Patented Sept. 24, 1912.
2 SHEETS—SHEET 2.
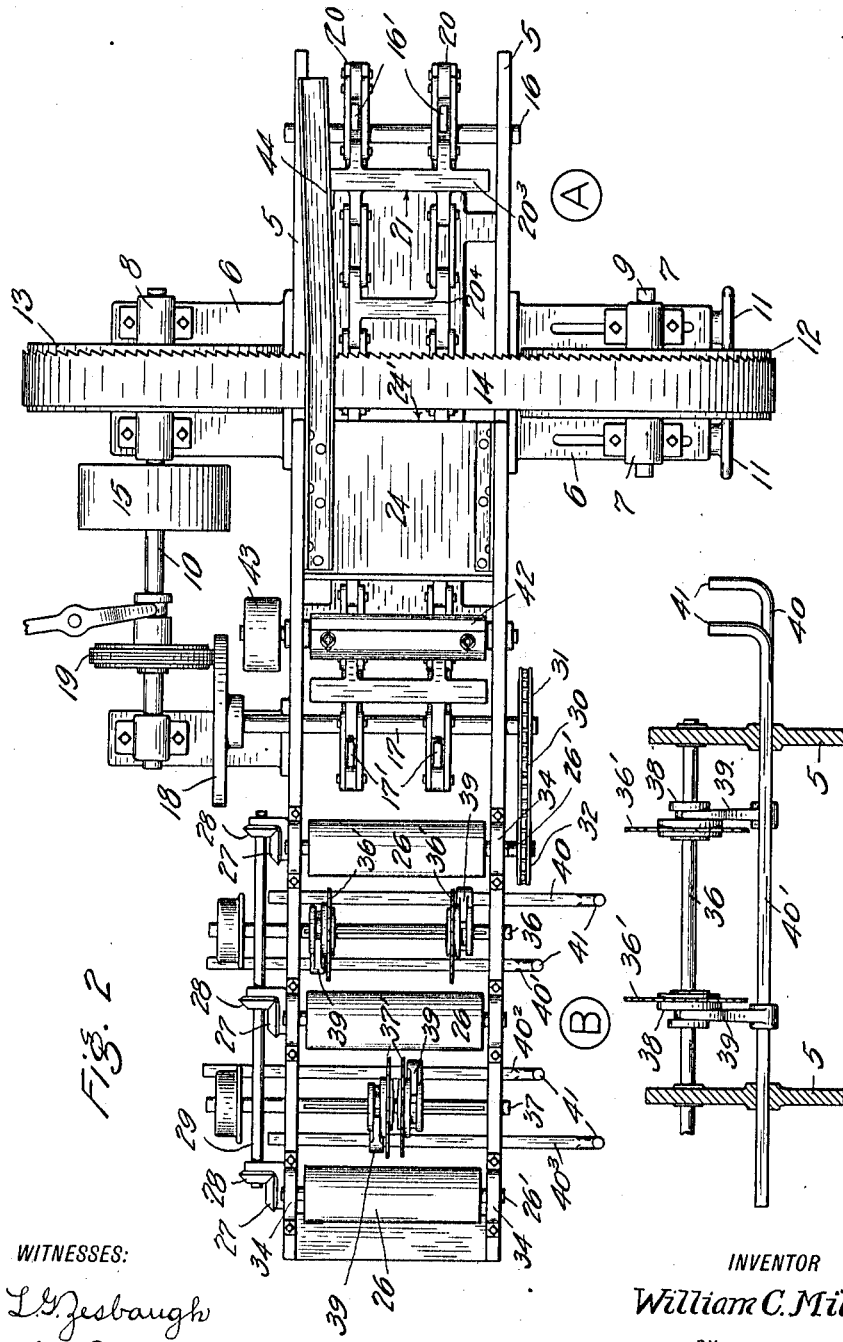
WITNESSES:
INVENTOR
William C. Miles
BY
ATTORNEY

UNITED STATES PATENT OFFICE.

WILLIAM C. MILES, OF SEATTLE, WASHINGTON.

COMBINED SHINGLE SAWING AND JOINTING MACHINE.

1,039,312.  Specification of Letters Patent.  Patented Sept. 24, 1912.

Application filed February 9, 1911. Serial No. 607,680.

*To all whom it may concern:*

Be it known that I, WILLIAM C. MILES, a citizen of the United States, residing at Seattle, in the county of King and State of Washington, have invented certain new and useful Improvements in Combined Shingle Sawing and Jointing Machines, of which the following is a specification.

This invention relates to shingle sawing and jointing machines.

The main object of the invention is to provide a machine of this character which will be more efficient in operation, and which will produce a greater output of shingles than is accomplished by other machines hitherto in use and with a relatively smaller amount of waste.

The accompanying drawings illustrate the invention.

Figure 1 is a longitudinal vertical section of the machine. Fig. 2 is a plan view of the same. Fig. 3 is a detail cross section taken through 3—3 of Fig. 1.

The reference numeral 5 designates the side members of a machine frame of suitable construction and supported upon brackets 6, extending laterally from such frame members, are the journal boxes 7 and 8 for longitudinal shafts 9 and 10 respectively. The boxes 7 are desirably of the type conventionally known as "sliding" or "take-up" boxes being moved and secured in adjusted positions through the medium of screws 11. Mounted upon said shafts are pulleys 12 and 13 for a band saw 14 which extends transversely across the machine frame and in proximity to its forward end. The shaft 10 is driven from any source of power, as by a transmission belt passing around a pulley 15 provided on this shaft. Bearings are provided in said frame members for transverse shafts 16 and 17 which are respectively located at the front end of the machine and at a distance to the rear of said band saw.

Mounted on shafts 16 and 17 are spaced sprocket wheels 16' and 17'. As illustrated, the shaft 17 is driven from the aforesaid shaft 10 through the medium of frictional gears 18 and 19, whereof the latter is splined for axial movement to its shaft and engages with its periphery the disk face of the other gear to afford a variable speed to the driven element, as will be understood. The chains 20 for said sprocket wheels are comprised of series of links 20' disposed intermediate of the abutment links $20^2$, as they may be termed, which are coupled in pairs by transverse bars $20^3$. Other links of one of the chains are similarly connected by bars $20^4$ with corresponding links upon the other chain. Said abutment links are provided with shoulders which are coextensive with the front faces 21 of bars $20^3$. From the bottom of such shoulders, said chains are formed to slope to the outer faces of the abutment links next in front, with respect to the travel of the chains, as indicated by the arrow $x$ in Fig. 1. This slope of the respective chain surfaces from a horizontal plane corresponds to the taper of a standard shingle, for example, five sixteenths of an inch in a length of sixteen inches—though they may be otherwise proportioned. Subjacent to the upper horizontally extending portion of said chains are shelf supports 22 therefor, secured to the adjacent frame members 5 as by the screw bolts 23 passing through slotted ears 22' of the shelves which allows for vertical adjustment.

To the rear of the band saw is a platform 24 having its forward end tapering to a relatively sharp edge 24' which is disposed in the horizontal plane of the operating portion of the band saw. As illustrated, the machine is provided to the rear of the platform 24 with pairs of transversely arranged rolls 25, 26. The axles of rolls 25 are journaled in bearings provided in said frame members and are operatively connected by pairs of miter gears 27 and 28 which are respectively secured to said axles and a shaft 29 extending along one side of the frame. Motion may be imparted directly to this shaft but, by preference, a sprocket chain 30 is utilized to effect the driving of the system of rolls from the shaft 17 through the instrumentality of sprocket wheels 31 and 32 which are respectively mounted on the shaft 17 and the adjacent of the axles of rolls 25. The other rolls 26 may be driven by similar or other suitable power transmission devices. As illustrated, however, the axles 26' thereof are journaled in boxes 33 which are movable vertically in guides 34 provided upon or secured to the frame.

35 represents springs employed to yieldingly press the rolls 26 into juxtaposition with the companion rolls 25, or against the upper surfaces of the shingles as received from the sprocket chains 20. Intermediate said pairs of rolls are transverse arbors 36 and 37, each carrying circular shingle jointing saws 36' and 37' by means of collars, such as 38. Said collars are splined for endwise movements on the respective arbors and are shiftable through the agency of forked arms 39 of rods 40, 40', 40² and 40³, engaging in peripheral grooves of the collars and having an end of each of such rods extend outwardly from the frame to terminate in handle ends 41 within convenient reach of an operator when stationed at B, Fig. 2.

42 is a planer head or "cylinder" which may advantageously be used with machines where planed shingles are to be produced. The spindle of the head has bearings in the frame member 5 and is driven by a belt passing about a pulley 43 on the spindle end.

44 is a guide or fence to prevent the block from which the shingles are to be cut being dragged sidewise by the band saw.

The operation is as follows: An operator standing at A places a block, as W, upon the chains 20 in front of the band saw 14 so that the back edge of the block will be caught by a shoulder 21. The block thus engaged will be carried with the chains and, in passing the band saw, that portion of the block lying within a recess, as it were, of the chain will be severed from the block. The part remaining in the recess constitutes a shingle which is carried onward under the planer head, if the latter is used, to have its top surface dressed and is then delivered to the feed rolls 25 and 26. These feed rolls cause the further travel of the shingle and during its progress the circular saws are shifted, by a second operator standing at B, to present the saws 36' into position to "edge" the shingle, that is effect the removal of any sap or faulty portion from its sides to make the sides parallel. The other saws 37' are also shifted, when required, into positions to remove from intermediate the width of a shingle a strip containing knots, rotten wood, etc. The shingle or the divided parts thereof are finally delivered by the rearmost of the rolls beyond the machine for sorting and packing. It may be said that the operations of the circular saws are best attained by having the feed rolls speeded to effect a greater travel to the shingles than that derived from the chains 20 which serve as a feed for the band saw. After the block has passed the band saw the portion above the saw will be lodged upon the platform 24 from where it is manually transported by the operator (A) to be again seated in the chains 20, and so on. After several shingles have been sawed from the block, or between the cutting of the successive shingles, the block may be turned end for end to compensate for the difference in thickness between the points and butts of the shingles and also to obviate as little waste as possible.

It is evident that the first cut from a block will make a marketable shingle; and that the block may be repeatedly cut while there is sufficient wood remaining in a block to serve for a shingle,—conditions which are practically unattainable in other machines with which I am familiar and in which dogging devices are essential for the blocks in the sawing of the same into shingles.

What I claim, is—

In combination with a frame, a band saw operating in a horizontal position thereabove and adapted for the removal of a shingle from the underneath side of a block, feed links adapted for movement transversely beneath said saw and each of said links having a sloping face thereof corresponding to the taper of a shingle, three adjacent links unitedly forming the seat for a single complete shingle, means for operating said saw and links, a platform with a tapered forward edge positioned rearwardly of the same and in horizontal alinement therewith and adapted to receive the block thereon, and an inclined guide member mounted upon said platform, substantially in alinement with the line of movement of said links, and said saw being positioned transversely of and between said links and guide.

WILLIAM C. MILES.

Witnesses:
 PIERCE BARNES,
 T. H. MACLAFFERTY.

Copies of this patent may be obtained for five cents each, by addressing the "Commissioner of Patents, Washington, D. C."